May 23, 1944.   T. R. GILCHRIST   2,349,545
RAILWAY VEHICLE
Filed Jan. 5, 1942   2 Sheets-Sheet 1
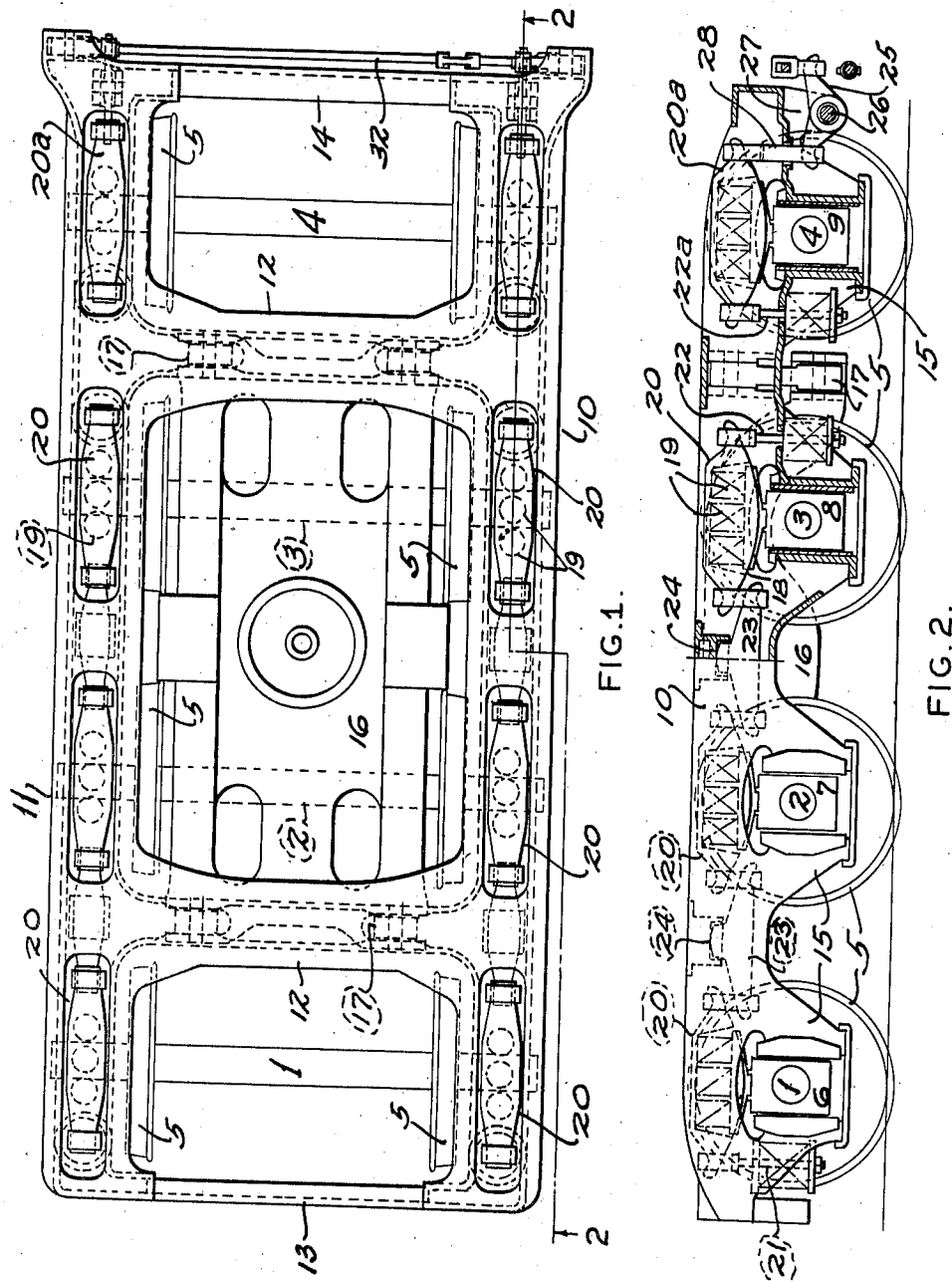
INVENTOR.
THOMAS R. GILCHRIST
BY Rodney Bedell
ATT'Y May 23, 1944.  T. R. GILCHRIST  2,349,545
RAILWAY VEHICLE
Filed Jan. 5, 1942  2 Sheets-Sheet 2
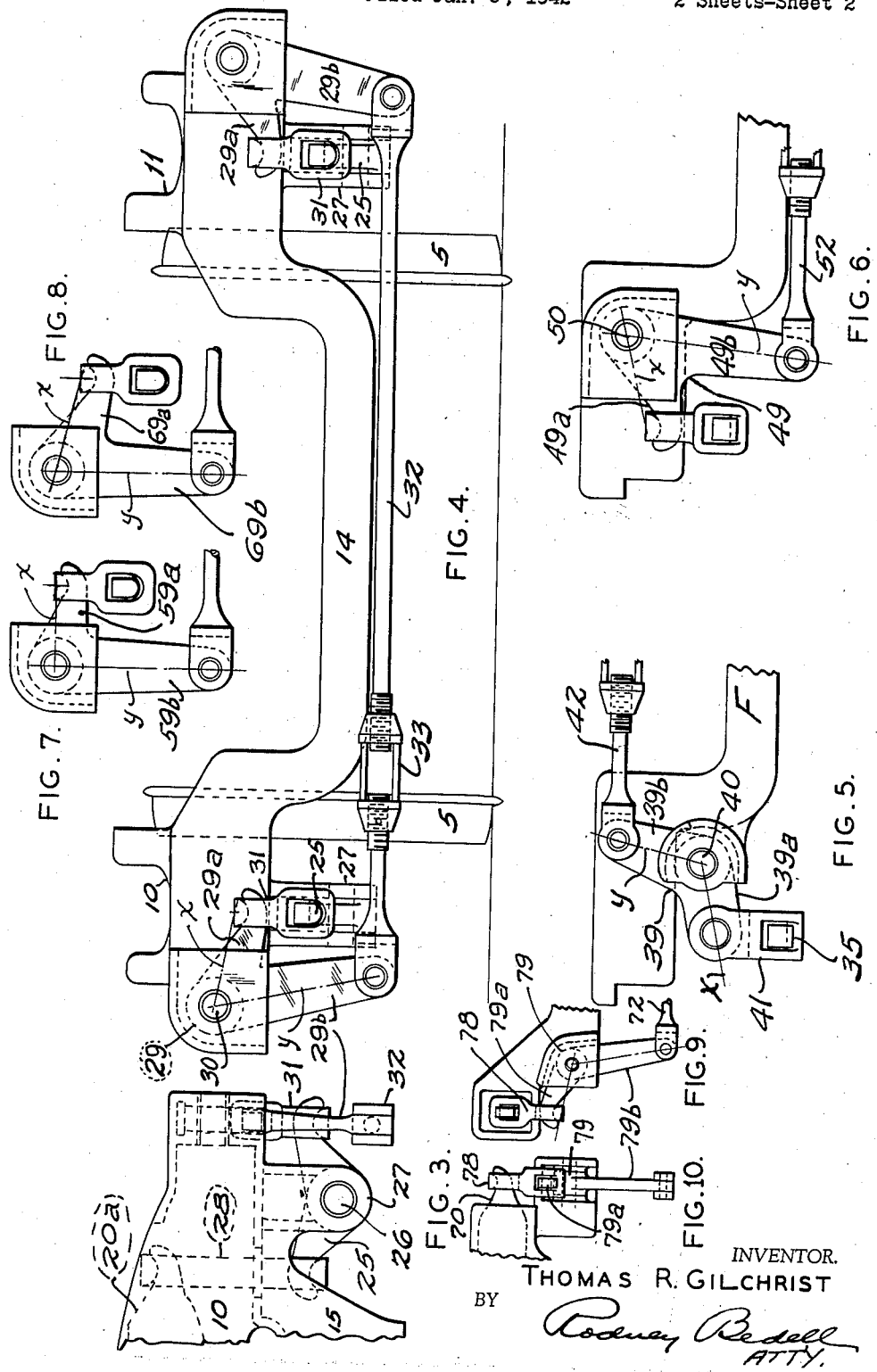
INVENTOR.
THOMAS R. GILCHRIST
BY Rodney Bedell
ATTY.

Patented May 23, 1944

2,349,545

UNITED STATES PATENT OFFICE 2,349,545

RAILWAY VEHICLE

Thomas R. Gilchrist, Yeadon, Pa., assignor to General Steel Castings Corporation, Granite City, Ill., a corporation of Delaware Application January 5, 1942, Serial No. 425,639

13 Claims. (Cl. 105—194)

The invention relates to the cross equalization of frame supporting springs at opposite sides of a railway vehicle structure and may be embodied in a swivelling truck structure as illustrated and described below or may be embodied in a structure in which the vehicle underframe is spring supported directly upon the wheeled axles.

Cross equalization of vehicle frame supporting springs has been effected heretofore, and reference is here made to Wintemberg and Ainsworth Patent No. 1,935,341, issued November 14, 1933, illustrating one cross equalization arrangement.

The main object of the present invention is to effect greater stability of the spring cross equalizing system under any loading condition and under departure of the springs, levers, etc. from their normal position, due to upward projections or depressions in the track or other track irregularities, or due to the shifting of the load to one side of the vehicle due to travel on curved track, etc.

In the accompanying drawings illustrating the invention—

Figure 1 is a top view of an eight-wheel swivel truck embodying a selected spring support arrangement.

Figure 2 is a side elevation and longitudinal vertical section taken on the line 2—2 of Figure 1.

Figure 3 is a detail side elevation of the right hand end of the structure shown in Figures 1 and 2 but drawn to an enlarged scale.

Figure 4 is an end elevation looking towards the right hand end of Figures 1, 2 and 3.

Figures 5-9 each correspond to the left hand side of Figure 4 but illustrate modifications of the construction illustrated in Figures 1-4.

Figure 10 corresponds to Figure 3 but illustrates the construction shown in Figure 9.

The truck includes four axles, 1, 2, 3 and 4, provided with wheels 5, the end portions of the axles mounting journal boxes 6, 7, 8 and 9 respectively. The truck frame preferably consists of a rigid structure including wheel pieces 10 and 11, each extending over all of the wheels at one side of the truck, transverse transoms 12, and end rails 13 and 14, the wheel pieces having depending pedestal legs 15. A load supporting bolster 16 is carried by the truck frame in any desired manner, here indicated as by suspension links 17 providing for lateral motion of the bolster.

Mounted on each journal box is a spring unit, here shown as a saddle 18 elongated lengthwise of the truck, seating a group of upright coil springs 19 which carry an elongated spring cap 20. The left hand end of the cap 20 on box 6 at one side of the truck is anchored to the truck frame by a yielding connection 21. The right hand end of cap 20 on box 8 is similarly anchored to the frame by a connection 22. The other ends of these two caps and both ends of cap 20 on box 7 support the ends of equalizers 23 which, in turn, support the frame intermediate their ends, as indicated at 24. Each journal box 9 on axle 4 mounts a spring unit similar to those previously described but not connected to the other spring units on the same side of the truck.

Each of these spring units includes a cap 20a with its inner end anchored to the truck frame by a connection 22a. An equalizing lever 25 is pivoted at 26 to a bracket 27 depending from the end portion of the wheel piece, and the inner end of lever 25 is suspended by a link 28 from the outer end of cap 20a.

A bell crank 29 is pivotally supported at 30 on the truck frame adjacent the outer end of each lever 25, and each bell crank includes a lateral arm 29a and a substantially vertical arm 29b. A link 31 supports the outer end of lever 25 from the outer end of arm 29a. A rod 32 connects the lower end of arm 29b to the corresponding arm of a similar bell crank 29 at the opposite side of the truck. Preferably, rod 32 is in two parts connected by a turnbuckle 33, whereby the arms 29b of the two bell cranks may be adjusted towards and away from each other to vary the height of the adjacent end of the truck.

Elements 28, 25, 29 and 32 constitute a cross equalizer connecting the spring units at the opposite ends of axle 4, and these spring units and their cross equalizer constitute a single spring assembly having its center on the longitudinal center line of the truck at the corresponding end portion of the truck. The remaining spring units at each side of the truck constitute a single spring assembly having its center over axle 2. This combination of spring assemblies does not in itself constitute the present invention but is merely illustrative of the application of the cross equalizer structure, which may be used also in connection with different groupings of axle and spring units as illustrated, for example, in the above-mentioned Wintemberg and Ainsworth Patent 1,935,341.

Normally the lever elements engaging links 28 and 31 are substantially above the level of the axes of the lever pivots 26. This relation between the pivots of the equalizing levers and the supports of their ends gives a corrective influence to the spring assembly tending to stabilize the latter, whenever it is distorted temporarily by the application of a greater load to one side of the truck frame than to the other, because rotation of the lever in a clockwise direction results in decreasing the effective length of the left hand or loaded arm and increasing the effective length of the right hand or stabilizing arm. Hence, when the abnormal load is removed, this difference in arm lengths tends to return the parts to their original positions.

Normally the arms 29a and 29b of the bell cranks 29, engaging links 31 and rod 32, are inclined from the horizontal and vertical as illustrated by the broken lines $x$ and $y$ respectively.

As an increase in the load applied to the lateral arm 29a of the bell crank at the left hand side of Figure 4 rotates the bell crank in a clockwise direction, the effective length of the lateral or loaded arm is decreased and the effective length of the substantially vertical or stabilizing arm is increased. At the same time, the corresponding rotation of the bell crank at the right hand side of the truck results in decreasing the effective length of its substantially vertical arm 29b to which the unbalanced load is applied and results in increasing the effective length of its lateral arm 29a which, under the thrust of the right hand spring unit, is the stabilizing arm. The corrective influence of the bell crank arrangement is cumulative to that resulting from the relation between the fulcrum and the ends of equalizer 25.

Also, the angle between the arms of the bell cranks and the inclination of these arms to the vertical and horizontal respectively give a corrective influence to the spring assembly tending to stabilize the latter.

The effective axis of arm 29a is indicated by the broken line $x$ extending through the center of pivot 30 and through the center of the pivotal movement of link 31 about its support on arm 29a. The effective axis of arm 29b is indicated by the broken line $y$ extending through the center of pivot 30 and the pin connecting the lower end of the arm with rod 32.

Similar stabilization may be effected by different arrangements of the parts, and particularly by different dispositions of the bell cranks.

Figure 5 illustrates another form of the invention in which the bell crank 39, pivoted at 40 to the truck frame F, has its substantially vertical arm 39b of the bell crank extending upwardly from its pivot 40 and its lateral arm 39a extending outwardly of the truck from the pivot 40. The connection 42 between bell cranks at opposite sides of the truck and the link 41 supporting the adjacent end of the equalizing lever 35 are substantially the same as the corresponding parts previously described.

An increase in the load at the left hand side of the truck lowers the end of the equalizing lever 35, rotating the bell crank in an anticlockwise direction, and this decreases the effective length of its downwardly inclined lateral arm 39a and increases the effective length of its substantially vertically disposed arm 39b. Hence there results the same corrective influence previously described.

Figure 6 illustrates another form of the invention in which the lateral arm 49a of the bell crank normally extends outwardly and downwardly from the bell crank pivot 50, as does the lateral arm shown in Figure 5, but the substantially vertical arm 49b of the bell crank extends downwardly from the pivot 50 and outwardly of the truck. With this arrangement, the tendency of the load on bell crank 49 is to rotate the latter in a counterclockwise direction; hence the connection 52 between the bell cranks at opposite sides of the truck are subject to compression rather than to tension, as are the rods 32 and 42 in the previously described forms of the invention. The corrective influence resulting from a temporary increase in load at one side of the truck is the same as previously described.

If the corrective influence of the equalizing lever is sufficient for the intended purpose, the bell crank may be arranged to avoid additional corrective influence, and such an arrangement is illustrated in Figure 7, in which the bell cranks, in their normal positions, will have the effective axes of their lateral arms 59a truly horizontal and the effective axes of their substantially vertical arms 59b truly vertical. Hence, rotation of the bell cranks, from the normal positions, results in simultaneously decreasing the effective length of both arms of each bell crank and no corrective influence is set up in the bell cranks themselves.

Another arrangement, shown in Figure 8, provides for the creation of a corrective influence in the bell cranks resulting from a differential in the effective length of one arm only of each bell crank. Here the axis of the lateral arm 69a is inclined from the horizontal so that, when both of the bell cranks are rotated, the effective length of the lateral arm of one bell crank is decreased and the effective length of the lateral arm of the other bell crank is increased, but the depending arms 69b disposed truly vertical, are shortened and lengthened simultaneously and, therefore, in themselves, do not affect the corrective influence.

Upon consideration, it will appear that the arrangements shown in Figures 4, 5 and 6 will provide the greater corrective influence, and accordingly these arrangements would be preferable where the spring system was less stable; for example, with relatively long spring units and relatively narrow bearings on the boxes. However, increase in the corrective influence results in stiffening of the spring action of the cross equalized springs and, where a softer spring action is more important, the arrangements shown in Figures 7 and 8 may be preferred for this reason.

The construction illustrated in Figures 9 and 10 results in corrective influence produced by the bell cranks similar to that described above but does not include the equalizing lever or other means between the springs and the bell cranks having a corrective influence on the departure of the springs from their normal position.

With this arrangement, each bell crank 79 has its lateral arm 79a connected by a link 78 directly to the outer end of the spring cap 70, which corresponds to the spring cap 20a in Figures 1–4. The downwardly extending arm 79b of the bell crank is connected by tie rod 72 to the corresponding arm of the bell crank at the opposite side of the truck. Abnormal load applied to the frame at the left hand side of the truck will cause the illustrated bell crank to rotate in a clockwise direction similarly to the bell cranks illustrated in Figures 4, 7 and 8, and this rotation will result in decreasing the effective length of the loaded arm 79a and increasing the effective length of the stabilizing arm 79b.

The details of the structure may be varied otherwise than as described and the exclusive use of those modifications coming within the scope of the claims is contemplated.

What is claimed is:

1. In a railway vehicle, a wheeled axle, a frame, frame-supporting spring structures carried on said axle at opposite sides of said frame, an equalizing lever at each side of the vehicle and pivoted intermediate its ends to said frame, a connection between the end of each lever nearest the axle and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the spring structures at opposite sides of the vehicle is cross equalized, the ends of each equalizing lever being supported by their respective connections to the adjacent spring structure and bell crank at points above the level of the intermediate pivotal support of the frame by the lever.

2. In a railway vehicle, a wheeled axle, a frame, frame-supporting spring structures carried on said axle at opposite sides of said frame, an equalizing lever at each side of the vehicle and pivoted intermediate its ends to said frame, a connection between the end of each lever nearest the axle and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the spring structures at opposite sides of the vehicle is cross equalized, the ends of each lever being above the level of its pivotal connection to the frame and below the level of the pivotal connection of the corresponding bell crank to the frame.

3. In a railway vehicle, a wheeled axle, a frame, frame-supporting spring structures carried on said axle at opposite sides of said frame, an equalizing lever at each side of the vehicle and pivoted intermediate its ends to said frame, a connection between the end of each lever nearest the axle and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the spring structures at opposite sides of the vehicle is cross equalized, the laterally extending arm of each bell crank is inclined downwardly from the horizontal from its pivot towards its support for the equalizing lever.

4. In a railway vehicle, a wheeled axle, a frame, frame-supporting spring structures carried on said axle at opposite sides of said frame, an equalizing lever at each side of the vehicle and pivoted intermediate its ends to said frame, a connection between the end of each lever nearest the axle and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the spring structures at opposite sides of the vehicle is cross equalized, the pivots on the frame for the bell cranks being nearer the sides of the vehicle than the adjacent ends of the equalizing levers, and the substantially vertically extending arm of each bell crank extending downwardly from its pivot alongside of the connection between the corresponding lever and the laterally extending arm of the bell crank.

5. In a railway vehicle, a wheeled axle, a frame, frame-supporting spring structures carried on said axle at opposite sides of said frame, an equalizing lever at each side of the vehicle and pivoted intermediate its ends to said frame, a connection between the end of each lever nearest the axle and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the spring structures at opposite sides of the vehicle is cross equalized, the pivots on the frame for the bell cranks being nearer the longitudinal center of the vehicle than the adjacent ends of the equalizing levers, and the substantially vertically extending arm of each bell crank extending from its pivot upwardly above the level of the adjacent end of the corresponding lever, the laterally extending arm being inclined downwardly from the horizontal from its pivot towards its support for the lever.

6. In a railway vehicle, a wheeled axle, a frame, frame supporting spring structures carried on said axle at opposite sides of said frame, an equalizing lever at each side of the vehicle and pivoted to said frame, a connection between one end of each lever and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the springs at opposite sides of the vehicle is cross equalized, the lateral arms of the bell cranks extending in opposite directions from their respective pivots and being similarly inclined from the horizontal when in normal position so that an increased load on the lever connected to one bell crank swings the bell crank in a direction to decrease the effective length of its lateral arm and to increase the effective length of the corresponding arm of the other bell crank, the vertical arms of the bell cranks being correlated with the lateral arms whereby a corrective influence is set up tending to return the spring structures, equalizers and bell cranks to their normal position upon each departure therefrom.

7. In a railway vehicle, a wheeled axle, a frame, frame supporting spring structures carried on said axle at opposite sides of said frame, an equalizing lever at each side of the vehicle and pivoted to said frame, a connection between one end of each lever and the adjacent spring structure, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the springs at opposite sides of the vehicle is cross equalized, the lateral arms of the bell cranks normally being inclined inwardly and downwardly from their pivots and the interconnected arms of the bell cranks normally being inclined inwardly from the vertical, whereby temporarily increasing the load on one spring structure and its equalizing lever and the associated bell crank moves the bell cranks about their pivots from their normal positions and decreases the effective length of the lateral arm on said bell crank and the vertical arm on the other bell crank and increases the effective length of the other arms on the two bell cranks and sets up a corrective influence tending to return the spring structures, equalizers and bell cranks to their normal positions, the lateral arms of the bell cranks normally being inclined from the horizontal and the interconnected arms of the bell cranks normally being inclined in opposite directions from the vertical, whereby movement of the bell cranks about their pivots from their normal positions decreases the effective length of one set of corresponding arms on the two bell cranks and increases the effective length of the other set of corresponding arms on the two bell cranks and sets up a corrective influence tending to return the spring structures, equalizer and bell cranks to their normal positions.

8. In a railway vehicle, a wheeled axle, a frame, frame supporting spring structures carried on said axle at opposite sides of said frame, an equalizing lever at each side of the vehicle and pivoted to said frame, a connection between one end of each lever and the adjacent spring structures, a bell crank at each side of the vehicle and pivoted to the frame to rock in a plane extending transversely of the frame and having a lateral arm and a substantially vertical arm, the other end of each lever being connected to the swinging end of the lateral arm of the adjacent bell crank, and a member connecting the swinging ends of the substantially vertical arms of said bell cranks to each other, whereby the action of the springs at opposite sides of the vehicle is cross equalized, the lateral arms of the bell cranks normally being inclined from their pivots inwardly from the sides of the vehicle and downwardly towards the connection to the corresponding equalizing lever and the substantially vertical arms of the bell cranks normally being inclined downwardly from their pivots and towards each other, whereby movement of the bell cranks about their pivots from their normal positions decreases the effective length of one set of corresponding arms on the two bell cranks and increases the effective length of the other set of corresponding arms on the two bell cranks and sets up a corrective influence tending to return the spring structures, equalizer and bell cranks to their normal positions.

9. In a railway vehicle, a wheeled axle, a frame, spring structures carried on said axle at opposite sides of said frame, a bell cran at each side of the vehicle and pivoted to the frame to rock in a plane extending transversely of the frame and having a lateral arm and a substantially vertical arm, the lateral arms of the bell cranks extending in generally opposite directions from their respective pivots and the substantially vertical arms extending in the same general direction from their respective pivots, a member connecting the swinging ends of the substantially vertical arms of the bell cranks to each other, and means connecting the swinging end of the lateral arm of each bell crank and the adjacent spring structure so that the spring structures support the frame, the action of the spring structures at opposite sides of the vehicle being cross equalized by the bell cranks and the member connecting their substantially vertical arms, the angle between the arms of each bell crank being other than 90° and the bell cranks being so disposed that when they are in their normal position an increased load on the lateral arm of one bell crank swings that bell crank in a direction to decrease the effective length of its lateral arm and to increase the effective length of its substantially vertical arm and swings the other bell crank in a direction to increase the effective length of its lateral arm and to decrease the effective length of its substantially vertical arm, whereby a corrective influence is set up tending to return the spring structures and bell cranks to their normal position upon each departure therefrom.

10. A structure as described in claim 9 in which the laterally extending arm of the bell crank is at an angle to the horizontal line when in normal position.

11. A structure as described in claim 9 in which the laterally extending arms and the substantially vertically extending arms of the bell cranks are at an angle to the horizontal line and to a vertical line, respectively, when in normal position.

12. In a railway vehicle, a wheeled axle, a frame, frame supporting spring structures carried on said axle at opposite sides of said frame, a horizontally disposed equalizing lever at each side of the vehicle and pivoted to said frame, a connection supporting one end of each lever from the adjacent spring structure, a bell crank at each side of the vehicle and pivoted to the frame to rock in a plane extending transversely of the frame and having a lateral arm and a substantially vertical arm, a connection supporting the other end of each lever from the swinging end of the lateral arm of the adjacent bell crank, and a member connecting the swinging ends of the substantially vertical arms of said bell cranks to each other to equalize the action of the spring structures at opposite sides of the vehicle, the two ends of each equalizing lever engaging their supporting connections to the adjacent spring structure and bell crank at points above the level of the pivotal support of the frame by the lever, whereby the frame load on the lever tends to hold the lever in its normal horizontal position.

13. A railway vehicle structure as described in claim 12 in which the pivotal connections of the bell cranks to the frame are above the level of the supporting connections for the ends of the equalizing levers.

THOMAS R. GILCHRIST.